March 13, 1962     J. P. ORTH     3,024,540
MATHEMATICAL RELATIONSHIP COMPARISON DEVICE
Filed Sept. 22, 1960
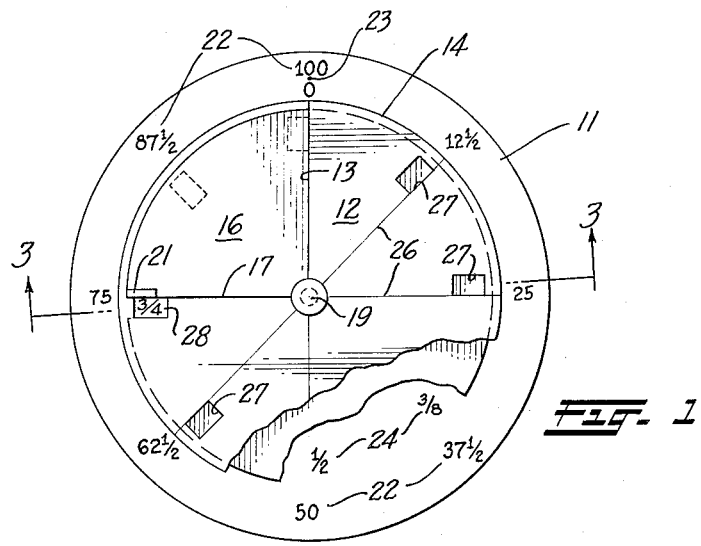
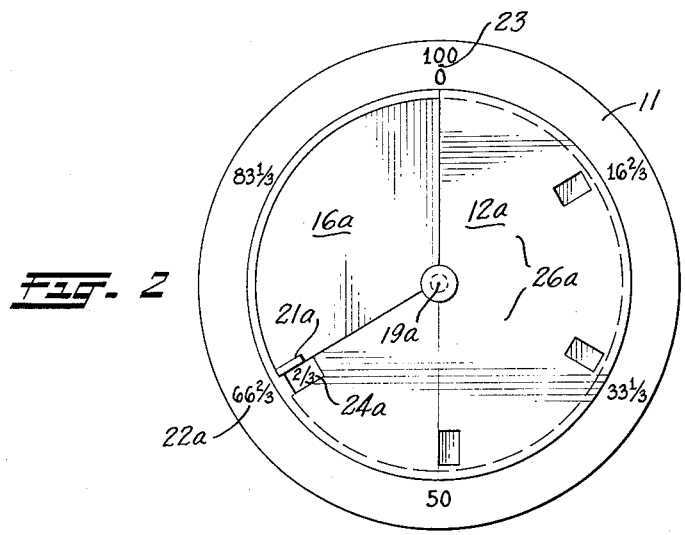
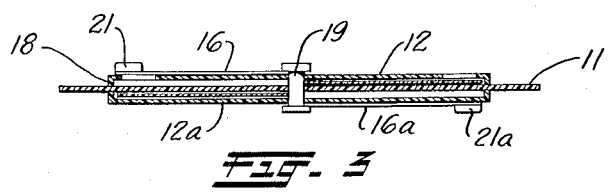
INVENTOR:
JOSEPH P. ORTH
BY Schapp & Hatch
ATTORNEYS United States Patent Office 3,024,540
Patented Mar. 13, 1962

3,024,540
MATHEMATICAL RELATIONSHIP COMPARISON
DEVICE
Joseph P. Orth, San Rafael, Calif.
(P.O. Box 484, Novato, Calif.)
Filed Sept. 22, 1960, Ser. No. 57,718
2 Claims. (Cl. 35—31)

This invention relates to improvements in a mathematical relationship comparison device and more particularly to teaching aids designed to illustrate the relationship between segments of a circular body and the corresponding fractional and numerical values.

It has been found that the teaching of mathematical and arithmetical concepts may be greatly aided by providing the visual equivalents of the numerical values being presented. For example, in discussing fractions and their inter-relationships, it is valuable to show to the student a body having a segment corresponding to the fraction under discussion removed from the body.

While pictures and other static illustrations can serve this purpose to a limited degree, by their very nature it is difficult to convey to the student a complete sense of how the area relationships change in accordance with the change in the value of the fraction.

The present device provides a simple and inexpensive method of revealing these concepts to the mind of the student by reason of the ambulatory nature of the device. This is done by the use of a circular body divided into a number of equal segments and arranged so that a desired number of the segments may be covered by a movable shield. Indicia are provided to illustrate the size of the individual segments as related to the whole circle and as related to the number of segments visible to the student.

As a novel feature, the circle is divided into one hundred parts. The student may quickly observe the relationship of the size and number of segments to the decimal system presently employed as the basis of arithmetical and mathematical functions. This is in contrast to the common practice of marking circles into 360 degrees. For present purposes the marking of circles into degrees is confusing to the student, while marking the circle into hundredth parts makes it easier for him to recognize the spatial relationship between the numerical values and the segments of the circle.

The device is also provided with indicia which show the common fractional relationship of the number of segments contemplated to the circle as a whole. It is contemplated that the circle will be divided into segments corresponding to the more common fractions, that is, into quarters, sixths, eighths, tenths, etc. However, it should be understood that the number of segments may be varied to provide the fractional relationships desired to be taught.

In any event, the fractions are positioned adjacent to the indicia indicating the number of hundredths of a circle from a fixed base point so that the relationship therebetween may be perceived at a glance. Preferably, the device is constructed so that the indicia indicating hundredths of a circle are visible at all times while indicia indicating the fractional equivalent is visible only for the number of segments of the circle revealed to the gaze of the student.

Accordingly it is a principal object of the present invention to provide a device for comparing mathematical relationships which may be easily and quickly adjusted to reveal a desired number of segments of a segmented circle and to indicate to the onlooker the fractional and numerical equivalent thereof.

Another object of the present invention is to provide a device of the character described which is simple and sturdy in construction, making it practical for the instructor to stock a number of the devices for individual use and manipulation by the students.

Another object of the present invention is to provide a device of the character described having cut-out portions providing registerable windows adapted to clearly point out and illustrate the fractional equivalent of the area of the circle revealed.

Further objects and advantages of my invention will be apparent as the specification progresses, and the new and useful features of my mathematical relationship comparison device will be fully defined in the claims attached hereto.

The preferred form of my invention is illustrated in the accompanying drawing, forming part of this application, in which:

FIGURE 1 shows a side elevational view of a mathematical relationship comparison device constructed in accordance with the present invention, portions of the device being broken away to illustrate internal construction;

FIGURE 2, a side elevational view of a device similar to that of FIGURE 1 but marked off in a different number of segments; and FIGURE 3, a cross-sectional view taken substantially on the plane of line 3—3 of FIGURE 1.

While I have shown only the preferred forms of my invention, it should be understood that various changes or modifications may be made within the scope of the claims attached hereto without departing from the spirit of the invention.

Referring to the drawings in detail, the mathematical relationship comparison device of the present invention consists basically of a flat base sheet 11, a sheet 12 of disk shape formed with a radial slit 13 therein, and secured at its periphery 14 to the base sheet, and a disk-shaped sheet 16 of smaller diameter than sheet 12 and formed with a radial slot 17, the sheets 12 and 16 being interleaved as shown in FIGURE 3 so that relative rotative movement will cause sheet 16 to cover greater or lesser portions of sheet 12.

Clockwise rotation of sheet 16, as viewed in FIGURE 1, will uncover more and more of sheet 12 as more and more of sheet 16 passes thereunder through slot 13. Similarly, counterclockwise rotation of sheet 16 will cover more and more of sheet 12 as more and more of sheet 16 emerges through slot 13 in covering relationship to sheet 12.

As here shown, sheet 12 is formed with axially extending flange 18 which is secured to base plate 12 and which is long enough to provide space for sheet 16 to enter between sheet 12 and base plate 11. As stated, sheet 12 is of somewhat smaller diameter than sheet 16 in order to allow for this flange.

While the parts are held in concentric relationship by the flange 18, a smoother action is provided by journaling the centers of the disk-shaped sheets 12 and 16 on a central pin 19. An upstanding handle 21 is mounted to sheet 16 adjacent to the outer end of the slit 17. The handle 21 provides easy manipulation of sheet 16 and also acts as a limit stop to prevent accidental rotation of sheet 16 completely under sheet 12. In accordance with the present invention, indicia 22 are provided around the rim of base plate 11 to indicate the number of hundredths of the complete circle from a fixed base point 23. Also provided on the base plate 11 adjacent to the indicia 22 are additional indicia 24 which indicate the fractional equivalent of the indicia 22. The disk-shaped sheet 12 is divided by lines 26 into a plurality of segments of equal size, eight segments being shown in the device illustrated in FIGURE 1. The indicia 22 and 24 are related to these segments so that a visual comparison may be made.

As a feature of the invention, a plurality of cutouts 27 are formed in disk-shaped sheet 12 adjacent to the intersection of the segment-indicating lines 26 and the periphery of the sheet. These openings 27 provide windows through which the indicia 24 would be visible were it not for the disk-shaped sheet 16.

The latter sheet is provided with a single window 28 on the opposite side of slit 17 from handle 21. The window 28 is registerable with windows 27 so that the only fraction revealed to the view of the onlooker will be that corresponding to the relationship between the number of segments exposed and the number of segments in the entire circle.

The device may be made of any suitable material, plastic being preferred for reasons of easy workability, durability and convenience. The plastic material should preferably be rather opaque and the sheets 12 and 16 should be of contrasting colors to make the number of segments revealed more readily apparent.

FIGURE 2 illustrates a device similar in all respects to that of FIGURE 1 but in which the sheet 12a is marked by lines 26a into six segments rather than the eight segments shown in FIGURE 1. In all other respects the device of FIGURE 2 may be identical to that of FIGURE 1, with sheet 16a being rotatable on pin 19a to cover more or less of the segments of sheet 12a, as desired. Of course, the indicia 24a and 22a will be renumbered to correspond to the different fractions and will be relocated to the correct positions as shown in FIGURE 2.

Conveniently, the devices of FIGURE 1 and FIGURE 2 may be combined in the manner illustrated in FIGURE 3 wherein the device of FIGURE 1 is mounted on one side of a common base sheet 11 and the device of FIGURE 2 is mounted on the opposite side.

From the foregoing it will be seen that I have provided a novel device for comparing mathematical relationships through the use of a segmented circle which may be covered to any desired degree by a rotating member, and which will reveal the fractional relationship between the number of segments covered and the total number of segments in the circle.

I claim:
1. A device for comparing mathematical relationships, comprising a flat base member, a first sheet of disk shape formed with a radial slit therein and secured at its periphery to one side of said base member, a second disk-shaped sheet of smaller diameter than said first sheet and formed with a radial slit, the portions of each of said sheets adjacent to said radial slits being oppositely deflected to impart to the rim of each sheet a single convolution of helical form, the helixes of said sheets being intertwined so that said first and second sheets are interleaved whereby relative rotative movement will cause said second sheet to cover greater or lesser portions of said first sheet, and indicia on said base member beneath said first and second disk-shaped sheets and adjacent to the outer edges thereof, said first sheet being formed with a plurality of windows overlying said indicia so as to render the indicia visible therethrough, said second sheet being formed with a window adjacent to its said radial slit and selectively registrable with the windows in said first named sheet so as to reveal therethrough only the indicia corresponding to the segment of said first sheet exposed by said second sheet.

2. A device for comparing mathematical relationships as defined in claim 1 and wherein another pair of disk-shaped sheets corresponding to said first and second disk-shaped sheets are mounted on the opposite side of said base member and indicia are provided on said opposite side of the base member to indicate different fractional segments than the fractional segments indicated by said first-named indicia.

References Cited in the file of this patent
UNITED STATES PATENTS

| 1,539,868 | Roberts | June 2, 1925 |
| 1,836,643 | Chesham | Dec. 15, 1931 |
| 2,816,373 | Caddy | Dec. 17, 1957 |

FOREIGN PATENTS

| 15,279 of 1888 | Great Britain | Oct. 24, 1888 |